BEST AVAILABLE COPY

Dec. 23, 1930. H. J. L. FRANK Re. 17,910

FUSED SWITCHING DEVICE

Original Filed Jan. 12. 1927

INVENTOR.
Harrison J. L. Frank

BY Francis D. Hardesty

ATTORNEY.

Reissued Dec. 23, 1930 Re. 17,910

BEST AVAILABLE COP'

UNITED STATES PATENT OFFICE

HARRISON J. L. FRANK, OF DETROIT, MICHIGAN, ASSIGNOR TO BULL DOG ELECTRIC PRODUCTS COMPANY, OF DETROIT, MICHIGAN, A CORPORATION OF WEST VIRGINIA

FUSED SWITCHING DEVICE

Original No. 1,733,370, dated October 29, 1929, Serial No. 160,751, filed January 12, 1927. Application for reissue filed June 9, 1930. Serial No. 460,069.

This invention relates to switching devices and more particularly to switching devices of the plug and receptacle type, the plug carrying fuses thru which the receptacle contacts are connected.

Switches of this general character have heretofore been provided, but most of them, so far as has been observed, have been deficient in certain important characteristics, most of which have been remedied by the details of construction of the improved switch forming part of this invention.

One of the objects of this invention, therefore, is a switch of the character above described wherein the plug and receptacle are provided with cooperating barrier forming portions and slots, adapted to form a complete end-to-end barrier between parts of opposite polarity, and adapted to guide the plug into position in the receptacle, thereby facilitating quick switching and plugging of the device.

A further object is a form of plug and receptacle construction wherein the plug may be inserted in the receptacle in either of two positions, a switch "on" position and a switch "off" position, one characteristic being that, regardless of the position occupied by the plug, its surface does not substantially project above the surface of the receptacle. In other words, the plug does not interfere with the closing of the switch box door usually provided above the receptacle, when it has been inserted.

A still further object is a novel form of switch, one which can be partially and manually inserted into the receptacle and which is automatically forced into its final position by the closing of the usual switch box door.

A still further object is a plug and receptacle switch wherein the plug is so formed that it completely closes the receptacle before or as soon as the plug contacts engage the receptacle contacts, in order to prevent access to the plug contacts when they have been made "live" upon engagement with receptacle contacts.

An even further object is a plug carrying fuse clips and auxiliary and mechanically independent contact prongs electrically connected to said clips, as distinguished from previously used constructions of this character wherein the fuse clips themselves are used as contact making devices.

A still further object is a plug and receptacle which wherein the plug is insertable in the receptacle, frontwards or backwards, the plug carrying a handle so formed and so positioned with respect to the parts that it will not engage receptacle contacts when the plug has been inserted in the receptacle with the handle member towards the latter, the plug being provided with portions shielding the handle from the receptacle contacts, if desired.

A further object is a fuse plug having a barrier between fuses and parts of opposite polarity.

A further object is a plug and receptacle switch wherein the receptacle is adapted to hold the plug in position, regardless of what that position might be.

A still further object is a novel form of plug and receptacle switch wherein the plug is provided with contacts and fuses on one side only, the other side being left blank so that when the plug is inserted in the receptacle with the contacts and fuses exposed, no contact or fuse parts will be positioned near the receptacle contacts, or in exposed relation with respect to the same.

An even further object is a novel form of plug and receptacle switch, one which is adapted for use with heavy currents and which at the same time, is much more compact and efficient of operation than similar constructions heretofore provided.

Still further objects will readily occur to those skilled in the art upon reference to the following description and the accompanying drawing in which Fig. 1 is a front elevation of a cabinet involving the invention and adapted for two fuses.

BEST AVAILABLE COPY

Figure 4:
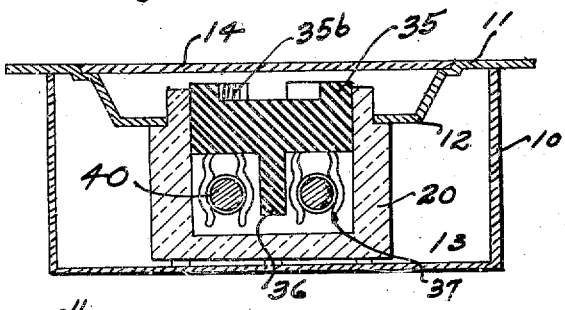
Fig. 4 is a section on line 4—4 of Fig. 1, the plug being in switch "on" position.
Figure 5:
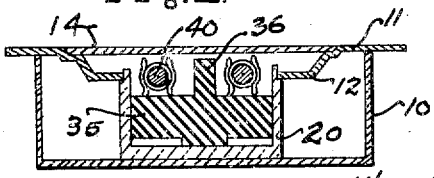
Figure 3:
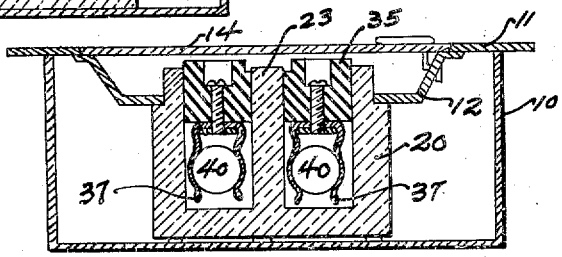
Fig. 3 is a cross section on line 3—3 of Fig. 1, the plug being in switch "on" position.

Fig. 5 is a section like that of Fig. 4 but with the plug in reversed or switch "off" position.

Figure 1:
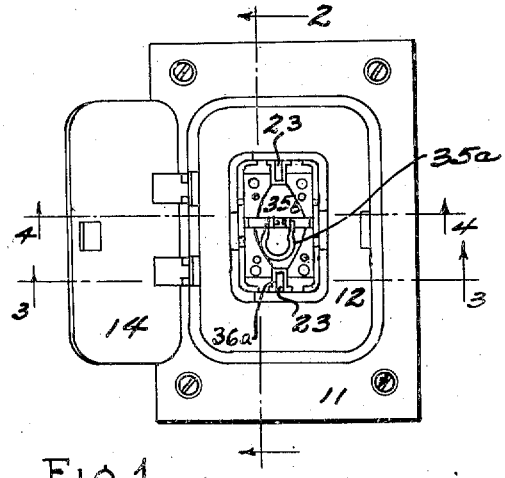

In the drawings there is indicated at 10 a metal cabinet provided with a flanged cover 11 having a depressed central portion 12 cut out at its central part and forming a mask for that part of the interior of the cabinet surrounding the receptacle (to be described in detail) and forming a chamber or compartment 13. Over the depressed portion 12 may be hinged a door 14 as shown in Fig. 1.

The receptacle consists of a rectangular cup-shaped socket of insulating material 20 having at each end an extension of foot 21 and one or more openings 22 to the inside of the cup immediately above the foot 21. Also, at each end inside the cup, on the longitudinal center line, thereof, is a vertical rib or barrier forming portion 23.

Figure 2:
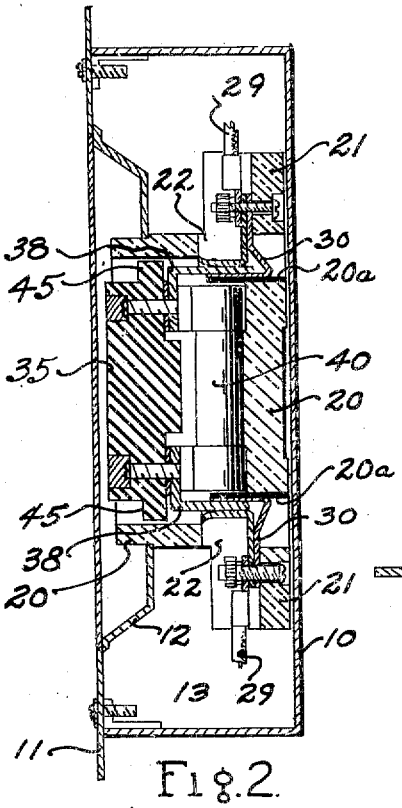
Fig. 2 is a vertical section on line 2—2 of Fig. 1.

The current carrying wires 29 are led into the cabinet 10 thru suitable openings (not shown) and are secured to L-shaped contacts 30 on top of the feet 21, as shown in Fig. 2, which contacts 30 extend thru openings 22 into the interior of receptacle 20 at the ends thereof, the contacts 30 being of spring material and divided as shown in this figure so that a cooperating plug finger or blade may be inserted between them. It is preferred to shield or protect the contacts 30 against accidental contact with the ends of the fuses by securing, in receptacle 20, strips 20*a* of insulating material extending up in front of the contacts 30 as indicated in Fig. 2, the strips 20*a* also preventing accidental connection between contacts 30 due to other causes.

Cooperating with receptacle 20 is a plug 35 adapted to fit into the receptacle. This plug is rectangular in its upper portion and is provided on its under surface with a rib 36 cooperating with the ribs 23 to divide the lower part of the receptacle interior into two compartments, ribs 23 and 36 cooperating to form a complete end-to-end barrier when the plug has been inserted in the receptacle. The plug 35, at its ends, has vertical grooves 36*a* cooperating with ribs 23 and thereby guiding the plug into the receptacle and facilitating quick switching action.

On the under side of the plug, and on each side of rib or barrier 36, there is provided a plurality of U shaped fuse holding clips 37, to the bight portions of which are attached the L-shaped auxiliary contact blades 38, the latter being longitudinally spaced from the clips and extending downwardly, so as to be adapted to be inserted between the two parts of contacts 30, as indicated in Fig. 2.

Plug 35 is removable with the fuses 40 in clips 37 so that the fuses may be replaced with safety, at a distance from the live receptacle contacts 30. It is also reversible so that the contact members 30 may be separated by the insulating material of the plug and may be completely covered thereby. When the plug is reversed the contacts 30 support the block by means of shoulders 45 which extend over the members, and in this reversed position, of course, no current can flow through leads 29. Further, the slotted barrier construction permits the plug to be inserted in reversed position and rest on the bottom of the receptacle, as will be observed.

In order to facilitate the removal of the block 35 a small bail or handle 35*a* is provided, the bail being preferably hinged so that it will be flat when not being used, and also being disposed in a recess 35*b* in the face of the plug.

It is also preferred to make the plug and receptacle switch and the cabinet of such relative proportions that the door of the latter, in closing, will push the plug 35 into its final position, if this has not already been done by the operator.

While the switch has been described as adapted for two fuses, it is, of course, obvious, that it may be adapted for any number of fuses and such adaptation is contemplated. It is also contemplated to provide plugs 35 with fuse clips for different sizes of fuses so that the same cabinet may be used for systems designed for different currents. Further, the fuse clips may be omitted and conducting strips used, and in this case the device becomes an ordinary switch, instead of a fused switch.

The device, constructed as described, provides a neat and compact instrumentality, in which the live conductors are completely covered when the plug 35 is in place and which provides efficiently against accidental contact with the live terminals 30 when the plug is out as such terminals are located within the socket 20 and are completely surrounded by insulating material, as shown.

It will thus be observed that there has been provided a switch having cooperating barrier portions 23 and 36 adapted, when brought together, to form a complete end-to-end barrier between the fuses 40 and also adapted to facilitate guiding of the plug 35 into its proper position in the receptacle 20.

Further, it will be observed that (Figs. 4 and 5) the plug 35 does not project above the receptacle 20 a substantial distance, thereby permitting closing of the cover 14 whether the plug be in the switch "on" position of Fig. 4 or the switch "off" position of Fig. 5.

It will also be observed that when the plug is to be placed in the receptacle, it can be partially inserted therein by the operator, the final step of insertion being caused by the closing of the door 14 which, striking the plug 35, forces it home.

Further, Fig. 4 readily discloses the fact that when the plug is inserted in the receptacle, the latter is completely closed before

BEST AVAILABLE COPY the contacts of the plug engage the contacts of the receptacle, thus preventing access to the plug contacts as soon as they have been made "live" by engagement with the receptacle contacts. Similarly, in withdrawing the plug, the receptacle is closed all the while the plug contacts are in engagement with the receptacle contacts.

It will further be observed, in Fig. 2, that the fuse clips 37 are not used as contact making devices, plugging contact being made by the cooperating contacts 38 and 30.

Furthermore, it will be observed that pivoted handle 35*a* will not engage receptacle contacts 30 when the plug is inserted backwards, this being due to the location and type of handle and also due to the walls of the recess 35*b* in which the handle is disposed, these walls serving also to shield the handle from the contact.

Furthermore, Figs. 4 and 5 disclose the closeness of the fit between the plug 25 and the receptacle 20, this feature among other things, serving to hold the plug in its position in the receptacle whether that position be the switch "on" or switch "off" position.

It will further be observed from Fig. 5 that the surface of the plug opposite the contact supporting surface is free of projections which might possibly engage the contacts in the receptacle, this feature preserving the separation of the receptacle contacts 30 and also preventing undesired connection thereof to the plug parts.

Further, it will readily be seen that the plug and receptacle form an extremely compact and efficient switch adapted for use with heavy currents and manufactured much more economically than switches heretofore used for this purpose.

Now, having described the invention, and the preferred embodiment thereof, it is to be understood that the said invention is to be limited, not to the details herein set forth, but only by the scope of the claims which follow.

I claim:

1. In a fusing device, a cup-shaped socket of insulating material having ribs on opposite walls, contact members in the bottom of said socket on opposite sides of said ribs, a fuse block of insulating material having a rib thereon with fuse holding and contact means on either side thereof, said fuse block adapted to fit into said socket and make contact between said means and members with said ribs in alignment whereby to form a dividing wall between said fuses and contacts.

2. In a fusing device, a cup-shaped socket of insulating material having contact members therein connected to suitable conductors, means in said socket to prevent accidental contact with said members, and a block of insulating material carrying fuses on one side thereof adapted to fit into said socket and connect said contact members thru the fuses, said block also adapted to fit into said socket in reversed position and thereby cover said contact members and separate the fuses from said contact members.

3. In combination, a cup shaped female member and a plug like male member, the latter having contacts thereon connected by and receiving a cartridge fuse, and adapted to cooperate with contacts in the female member, said members having cooperating insulation formations adapted to guide the male member into switching engagement with said female member, said formations being so arranged that the male member closes the opening in the female member before the contacts are in engagement, whereby to shield the latter.

4. In combination, a female switch member, and a male switch member, cooperating pairs of contacts on said members, a fuse on said male member between contacts thereon, said male portion being insertable in said female member in contact engaging position and also being insertable in said female member in reversed or contact separating open switch position, the side of said male member opposite the contacts thereon being free of projections which might engage the contacts in said female member when the male member is inserted therein in its open switch position.

5. A switching device comprising a female member having contact members adapted to be connected to current leads, a male member shaped to fit substantially wholly within said female member in either of two opposite positions and close the same, said male member carrying on one face means for holding a fuse and contact members connected with the ends thereof, the latter being so located as to coact with the first mentioned contact members and means in said female member to substantially completely shield the current carrying parts when said male member is removed.

6. A switching device comprising a female member in the form of a cup having in its ends contact members adapted to be connected to current leads, a male member shaped to fit substantially wholly within the opening of said cup in either of two positions and close the same, said male member carrying on one face means for holding a fuse and contact members connected with the ends thereof, the latter being so located as to coact with the first mentioned contact members when the male member is in the cup, and means in said cup to substantially completely shield the current carrying parts when said male member is removed therefrom.

7. In a switching device, a receptacle having a plurality of contacts therein, and a plug having a plurality of contacts on one side thereof adapted to cooperate with said

BEST AVAILABLE COPY receptacle contacts and having a handle member on the other side, said plug and receptacle being so formed that the plug may be disposed within the receptacle with the contacts thereon extending outwardly, said handle member being pivotally mounted on the plug so that when the latter is inserted in the receptacle with its contacts extending outwardly, the handle member will swing out of engagement with any of the receptacle parts or contacts.

8. In a switch cabinet provided with a door, a receptacle, and a plug adapted to fit inside said receptacle with its contacts exposed or unexposed, said receptacle and plug being so formed that when the plug is within the receptacle with its contacts exposed, the level of the latter is below the level of the door whereby the door may close without engaging said plug.

9. In a switch, a receptacle having barrier portions extending inwardly therefrom from end walls thereof, and a plug having slots in its end walls aligned with and of a size substantially like that of the barrier portions, the latter being adapted to cooperate with the slots in the plug to guide the plug into switching engagement with the receptacle.

10. In a switch, a receptacle having contacts therein, and a plug having contacts on one side thereof, the plug being insertable in said receptacle with the contacts exposed or unexposed, said plug and receptacle being so formed that the plug is substantially entirely within the receptacle when inserted in switch "on" or switch "off" position, said plug being cut away so as not to engage the receptacle contacts when inserted in the switch "off" position.

11. In a switching device, a receptacle having a plurality of contacts therein, and a plug having a plurality of contacts on one side thereof adapted to cooperate with said receptacle contacts, and having a handle member on the other side, said plug and receptacle being so formed that the plug may be disposed within the receptacle with the contacts thereon extending outwardly, said handle member being pivotally mounted in a recess on the plug so that, when the latter is inserted in the receptacle with its contacts extending outwardly, the handle member will swing out of engagement with any of the receptacle parts or contacts.

12. In a switch, a receptacle having spaced aligned barrier forming portions, contacts of opposite polarity on opposite sides of said barrier portions, a plug having a barrier forming portion and fuses and contacts of opposite polarity on opposite sides of said plug barrier portions, all of said barrier portions forming a complete end-to-end barrier between parts of opposite polarity when the plug is partially or completely inserted in said receptacle.

13. In a switching device, a receptacle having shielded contact members, a plug carrying fuses on one side only thereof adapted to fit into said receptacle and connect said contacts thru said fuses, said block also being adapted to fit in said receptacle in reversed position and separate said fuses from said contacts.

14. In a switching device, a receptacle having shielded contact members, a plug carrying fuses on one side only thereof adapted to fit into said receptacle and connect said contacts thru said fuses, said block also being adapted to fit in said receptacle in reversed position and separate said fuses from said contacts, and also to cover said contacts.

15. In combination, a contact containing receptacle and a contact supporting plug, the latter having a cartridge fuse connecting and received in the contacts thereon, said receptacle and plug having cooperating formations whereby insertion of the plug in the receptacle closes the latter before the contacts thereon are in mutual engagement and whereby upon withdrawal of the plug, the contacts are withdrawn from the mutual engagement before the plug is withdrawn from the receptacle.

16. A switching device comprising a cup shaped female member having therein contacts and a male member adapted to enter and be received within said female member and close the same, said male member being provided with contacts adapted to coact with the first mentioned contacts, the contacts of one of said members being provided with means for holding a cartridge fuse in place, the latter serving to connect in series the last mentioned contacts, all "live" portions of said members being covered with protective insulation when the parts are together, the male member being so proportioned that it can be inserted and maintained in the female member in reversed position, with the contacts and fuse holding means exposed, and separated from the contacts within the female member by the body of the male member.

17. In a device of the character described, in which coacting parts in one position close the circuit thru the device and in another position, maintain said circuit open, means to maintain the said parts in assembly but in open circuit relation, said means being so located as not to interfere with the placing of the parts in closed circuit relation.

18. In a switch, a receptacle having barrier portions extending inwardly therefrom from end walls thereof, and a plug having slots in its end walls aligned with and of a size substantially like that of the barrier portions and also having a barrier portion aligned with said slots, the latter being adapted to cooperate with the slots in the

BEST AVAILABLE COPY plug to guide the plug into switching engagement with the receptacle and to cooperate with the plug barrier portion to form a complete end-to-end barrier.

19. In a switch, a receptacle having contacts therein, and a plug having contacts on one side thereof, the plug being insertable in said receptacle with the contacts exposed or unexposed, said plug and receptacle being so formed that the plug is substantially entirely within the receptacle when inserted in switch "on" or switch "off" position.

20. In a switch, a receptacle, and a plug having contacts on one side only thereof, and adapted to be inserted in said receptacle with the contacts exposed or unexposed, said plug and receptacle being closely fitting and being so formed that the receptacle maintains the plug in place whether the plug be in its circuit making or in its circuit breaking position.

21. In a switch, a receptacle member and a plug member, slots in end walls of one of the members and portions projecting from end walls of the other of the members, the slots being of a size to receive closely the projecting portions, the latter serving to cooperate with the slotted portions to guide the plug into switching engagement with the receptacle.

22. In a switch, a receptacle having spaced barrier forming portions, contacts of opposite polarity on opposite sides of said barrier portions, a plug having barrier forming portions and fuses and contacts of opposite polarity on opposite sides of said plug barrier portions, all of said barrier portions cooperating, when the plug is in the receptacle, to form a barrier between parts of opposite polarity.

HARRISON J. L. FRANK.